Inventor:-
Walter E. Molins

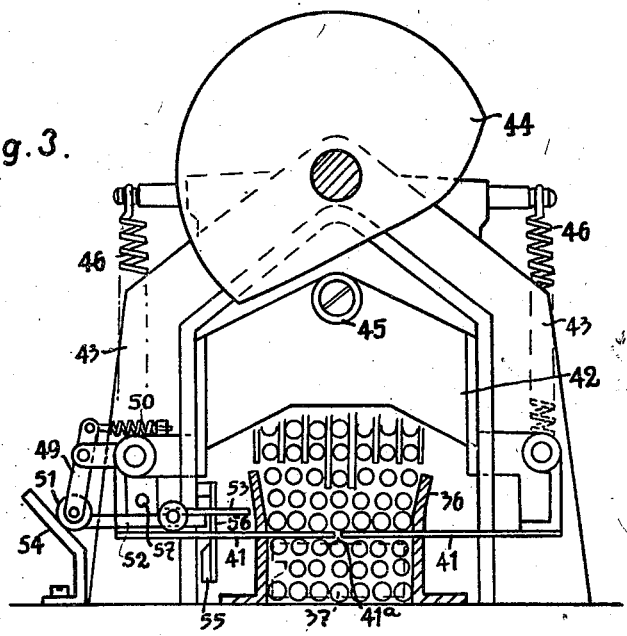

Sept. 28, 1926.  W. E. MOLINS  1,601,257
APPARATUS FOR FEEDING CIGARETTES AND OTHER ARTICLES OF SIMILAR SHAPE
Filed April 25, 1924   6 Sheets-Sheet 3

Inventor: Walter E. Molins
by [signature], Attorney

Sept. 28, 1926.　　　　　　　　　　　　　　　1,601,257
W. E. MOLINS
APPARATUS FOR FEEDING CIGARETTES AND OTHER ARTICLES OF SIMILAR SHAPE
Filed April 25, 1924　　　6 Sheets-Sheet 4

Sept. 28, 1926.
W. E. MOLINS
1,601,257
APPARATUS FOR FEEDING CIGARETTES AND OTHER ARTICLES OF SIMILAR SHAPE
Filed April 25, 1924    6 Sheets-Sheet 5

Inventor:-
Walter E. Molins
by [signature]
attorney

Sept. 28, 1926.  1,601,257
W. E. MOLINS
APPARATUS FOR FEEDING CIGARETTES AND OTHER ARTICLES OF SIMILAR SHAPE
Filed April 25, 1924    6 Sheets-Sheet 6
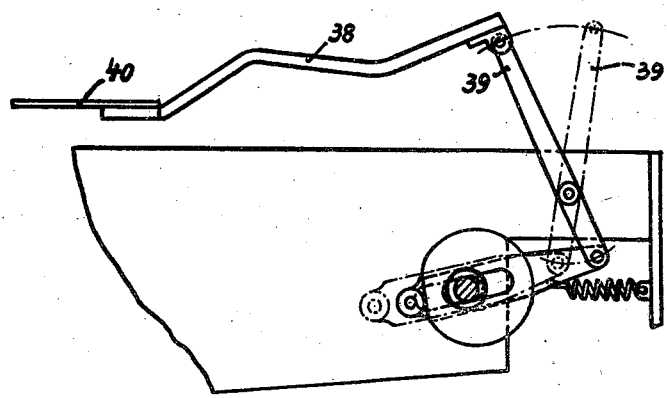
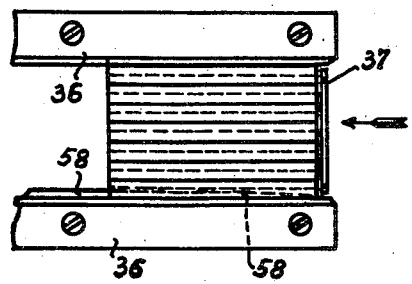
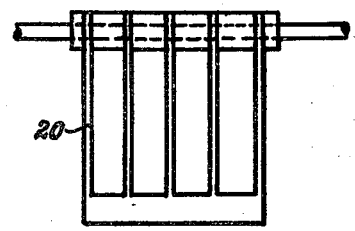
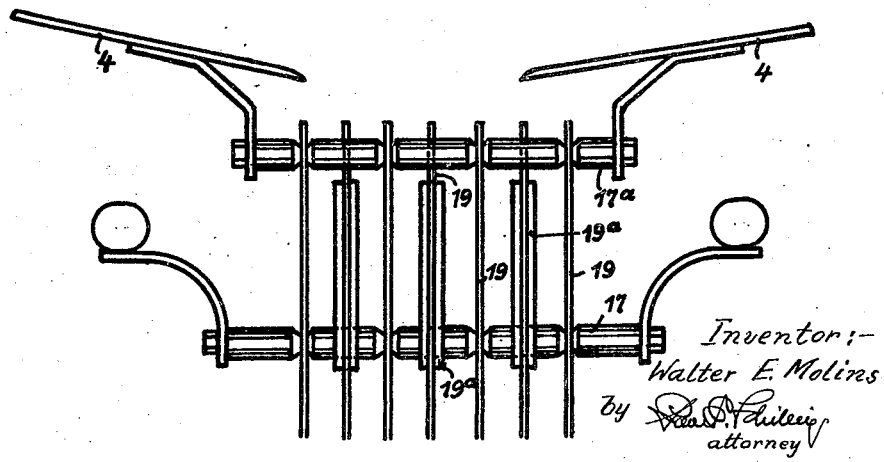
Inventor:—
Walter E. Molins
by
attorney Patented Sept. 28, 1926.

1,601,257

UNITED STATES PATENT OFFICE.

WALTER EVERETT MOLINS, OF LONDON, ENGLAND.

APPARATUS FOR FEEDING CIGARETTES AND OTHER ARTICLES OF SIMILAR SHAPE.

Application filed April 25, 1924, Serial No. 709,069, and in Great Britain May 15, 1923.

This invention relates to apparatus for feeding cigarettes and other articles of similar shape of the kind wherein the articles are contained in a hopper or box, the bottom of which slopes downwards in the manner of a funnel to an outlet provided with slots or grooves usually formed by thin blades or vanes, a plunger or other mechanism being provided for pushing the required number of articles out of the slots or grooves.

The invention has for its object to provide improved means for ensuring a regular and uninterrupted feed of cigarettes or articles to the slots with the minimum amount of pressure on said articles, so that waste or breakage, particularly in the case of cigarettes, is avoided.

Further, in the case of cigarettes, means may be provided for compressing the cigarettes laterally and for feeding them in such a manner that one or more rows may contain a less number of cigarettes than the others.

The hopper is also constructed to give easy access to the slots in case of jamming or obstruction.

According to the invention, a hopper, particularly adapted for dealing with cigarettes is so formed that the sloping bottom can be vibrated to feed the cigarettes into the slots formed by the vanes, the arrangement being preferably such that the vanes are also vibrated. Below the slots formed by the vanes a machine bed is arranged and between the bed and the slots, a pair of angle guides between which the cigarettes pass from the slots, is fitted. A conveyor such as is described in the specification of British Letters Patent No. 13,956 of 1915 runs along the bed and carries away a number of rows of cigarettes from the guides, according to the height of the pusher pieces thereon. The pusher pieces are arranged to support the cigarettes in the guides while travelling beneath same and automatic means such as a rising and falling table and a movable end support are also provided, co-operating with the pushers to ensure that the cigarettes fall substantially parallel and in good order.

If it is desired to vary the number of cigarettes in any row or rows, means are provided for automatically inserting a member in one of the slots and lifting the cigarettes therein upwards a distance of one row, so that when the cigarettes reach the bed, there is a space at the end of one row.

To enable the invention to be fully understood, it will now be described by reference to the accompanying drawings in which:—

Fig. 3 is a diagrammatic view of a portion of a modified form of hopper.

Figs. 4, 5 and 6 are views of details of various modifications.

Figs. 7, 8, 9 and 10 are schematic enlargements, illustrating the methods of packing different numbers of cigarettes. Figs. 11 and 12 are fragmentary views depicting the bending or flexing of the vanes. Fig. 13 is a similar view showing the guide pieces and the operating cam. Fig. 14 is a detail view of the arrangement for arresting certain cigarettes in the packaging of the same. Figs. 15, 16, 17 and 19 are detail views of the conveyor guides and the related cigarette-arresting mechanism. Fig. 18 is a view similar to Fig. 14 slightly modified. Figs. 20 and 21 are fragmentary views of the vane arrangements, slightly modified. Fig. 22 is a diagrammatic view of the plate, and its operating mechanism, for arranging the cigarettes.

Figure 1:
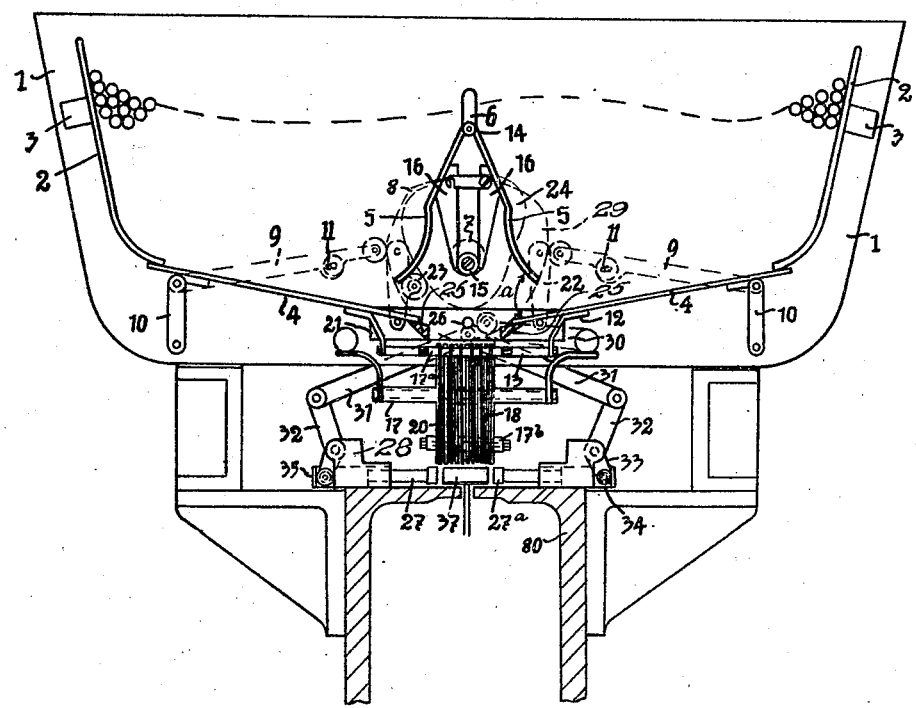
Fig. 1 is a view of an apparatus constructed according to one form of the invention, the front plate of the hopper being removed.

Referring to the apparatus shewn in Fig. 1—The hopper comprises a back plate 1 (a similar front plate not being shewn) curved side plates 2 adjustably mounted on studs 3 and a bottom consisting of two plates 4 sloping towards the centre of the hopper and leaving a gap therebetween. The plates 4 are secured at their lower ends to brackets 12 on the frame 13 and their upper ends are connected to links 10 which are oscillated by rods 9 operated by a cam 8 mounted on a shaft 7 rotatably mounted in the centre of the hopper. The rods 9 are guided by slots engaging studs 11 as shewn. The brackets 12 may be rigid as shewn, or made in the form of hinges. A pair of baffle plates 5 hinged to a support 6 are mounted in the centre of the hopper and are rocked about the centre 14 by an eccentric pin 15 on the end of the shaft 7, working in guide blocks 16 secured to the baffles. The space $a$ between the lower ends of the plates 5 and the bottom plates 4 is determined by the rate of feeding required.

Beneath the gap between the plates 4 a series of thin vanes 18 are clamped in position by screwed rods 17, $17^a$ and $17^b$, distance collars 19 being fitted between the vanes, forming a series of slots, the forward and rear ends of the slots being closed by vertical bars 20.

The space between the vanes is sufficient to enable cigarettes to pass down between the vanes easily, but is too small to allow the possibility of jamming at the top.

With the above described arrangement, if the hopper be filled with cigarettes and the shaft 7 rotated, the baffle plates 5 will be oscillated and the plates 4 vibrated through the motion of the cam 8. Since the plates 4 are secured to the member 13 of the vane frame the vanes will be bent about the clamping rod 17. The cigarettes will be continually passed through the spaces $a$ in the manner described in the specification of application for Letters Patent No. 27426 of 1922 and will pass down into the slots formed between the vanes 18, as shown in Figs. 11 and 12. Since the forward and rear ends of the vane slots are closed by the vertical bars 20, (Fig. 2) the cigarettes are under control endwise.

In order to keep cigarettes at the top of the vanes in free movement an agitator is preferably provided comprising a plate 21 carried on links 22, one link having a roller 23 thereon which engages a cam 24 on shaft 7. As the cam rotates the plate 21 swings from side to side. Guide pieces 25 forming a funnel to the vane slots and pegs 26 for moving the cigarettes are fitted to the plate 21, as shown in Fig. 13.

A pair of compressors 27 are provided beneath the bottom end of the vane slots, comprising end pieces $27^a$ mounted on slides 35 mounted in guide brackets 28. The end pieces $27^a$ slide on the machine bed 80 and the slides are actuated by cam 29 on shaft 7 through levers 30, links 31, 32 and 33, the links 33 carrying rollers 34 working in slots in the slides.

In some cases the compressors may be replaced by tapered guides 36 as shown in Figs. 3 and 4. The cigarettes are carried away from beneath the vane slots by a belt conveyor having pusher pieces 37 (one only being shown) which pass through a slot $37^a$ in the machine bed as shown.

In some cases, the pusher pieces may have shallow vertical slots therein, the slots allowing the pieces to pass through the vanes. This arrangement enables the vanes to be brought nearer to the machine bed which is an advantage in some cases.

Figure 2:
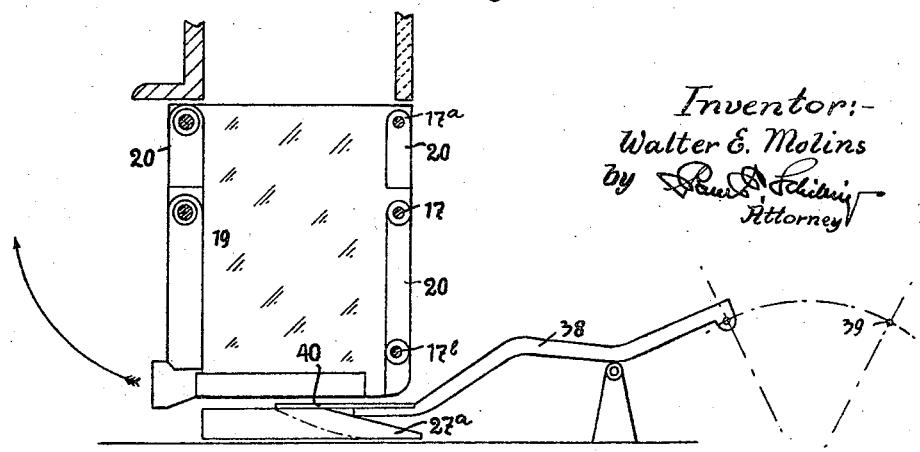
Fig. 2 is a view in longitudinal section of the vanes and lower portion of the hopper shown in Fig. 1.

To prevent the upper layers of cigarettes from falling after a pusher piece has passed, a moving support (Fig. 2) is provided. This support consists of a blade 40 carried on a bent arm 38 pivoted to a swinging arm 39 indicated in dotted lines. The rear portions of the compressor pieces $27^a$ are shaped as shewn. The blade 40 is moved to follow the movement of the conveyor pusher piece closely and as it moves forward it travels up the sloping portions of the pieces $27^a$, which are in the closed position, and passes under the cigarettes in the vanes (Fig. 2).

The compressors then move outwards and the blade 40 descends as it travels backwards, the movement being such that the cigarettes are deposited on the bed in good order.

An alternative arrangement for controlling the falling of the cigarettes from the vane slots is shewn in Fig. 3. In this figure it will be understood that the construction of the hopper and the vanes is similar to that above described with reference to Fig. 1, but guides 36 are used in place of the compressor pieces.

Arranged beneath the lower ends of the vane slots is a platform 41 having a central slot $41^a$ in which moves the shank or web of the conveyor piece 37, and carried by a slide 42 which reciprocates vertically in the frame 43 under the action of a cam 44 suitably mounted and rotated and engaging a roller 45 mounted on the slide. The follower roller of slide 42 is held against the cam by springs 46 as shewn in Fig. 15.

With this arrangement, as a conveyor piece passes through the hopper the platform 41 descends to the level of the machine bed and the cigarettes fall from the vane slots. The next conveyor piece passes through and over the platform 41, carrying the cigarettes away between the guides 36 and the platform immediately rises. During the actual passage of the conveyor piece through the hopper the cigarettes in the vane slots may be supported partly by a plate 40 as previously described with reference to Fig. 2, and partly by the overhanging end $37^a$ of the conveyor piece (Fig. 5). It will be obvious that the plate 40 can readily be operated independently of the compressor pieces 27 shewn in Fig. 22.

It is sometimes desired to pack cigarettes in superposed rows containing an odd number of cigarettes. For example twenty cigarettes may be packed in three rows, i. e. two rows of seven each and one row of six.

One method of accomplishing this method of packing is shewn in Fig. 6.

On one side of the vanes a block 47, Fig. 14, is placed equal in height to the diameter of a cigarette, thus preventing the cigarettes in the last slot from falling to the level of the machine bed. The compressor piece $27^b$ on the same side is stepped to accommodate the block and the pusher piece $37^b$ of the conveyor is shaped as indicated in dotted lines. The cigarettes are then pushed by the conveyor piece between suitable guides 36 having packing strips 48 corresponding with the block 47 so that the cigarettes are carried forward in the desired grouping (Fig. 4).

A further method, designed to obtain a feed in the order for example, a row of seven cigarettes, a row of six, and then a row of seven or similar groups is shewn in Fig. 3.

Referring to Fig. 3, a roller arm 49 carrying a roller 51, controlled by a spring 50 is pivotally mounted on the slide 42, a guide 54 for the roller being fixed to the machine frame. Hinged to the arm 49 is a carriage 52 carrying a thin plate 53. The guides 36 and the conveyor piece 37 are cut away in a suitable manner as in Figs. 15, 16 and 3 to allow the plate 53 to enter the cigarette space of the adjacent vane slot.

In operation, the downward movement of the slide 42 causes the roller 51 to move inwards by reason of the shape of the guide 54, the carriage 52 moving over platform 41 and pushing the plate 53 in between the last two cigarettes in the adjacent vane slot as shewn in Fig. 3. This motion continues until the end of the carriage meets a stop 55 held by a stiff spring 56, when the carriage turns about its pivot in the lever 49 causing the plate to tilt, pushing the column of cigarettes upwards in the vane slot through a distance of one cigarette. A stop 57 on the slide 42 prevents any further turning and forces the carriage past the stop 55.

When the cigarettes reach the machine bed there is a space at the end of the row occupied by the plate 53. The upward movement of the slide 42 causes the plate 53 to be withdrawn from the vane slot allowing a full row of cigarettes to pass through.

Figure 7:
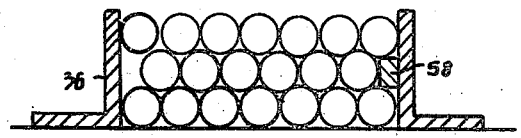

In order to push the middle row of the group, which contains six cigarettes only, into a central position, the group after delivery from the vanes is moved by the conveyor between guides 36, one of which is fitted with a tapered strip 58 (Fig. 7). This strip is arranged as shewn and as the cigarettes move between the guides the middle row is centralized. The upper and lower rows then lock the six cigarettes in position. The pusher piece is shaped or slotted to clear the strip 58.

It will be obvious that if it is desired to convey away a single row of cigarettes only the platform 41 and the end support 40 herein described may be dispensed with, leaving the cigarettes to drop on the bed as the pusher pieces pass. In this case the distance between the ends of the vane slots and the bed is so adjusted that only a small space is left and the cigarettes do not become disarranged in falling through so short a distance.

Figure 8:
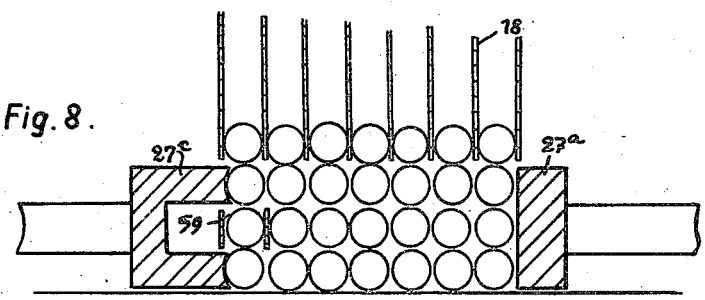
Figure 9:
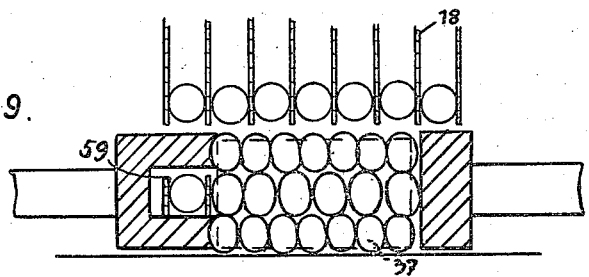

A further method, enabling a row of six cigarettes to be sandwiched between two rows of seven, is illustrated in Figs. 8 and 9.

As shewn, a compartment 59 consisting of two pieces of the same thickness as the vane and extending along the sides of a cigarette, corresponding to the vanes, is arranged on one side of the machine, below the ends of the vane slots. The forward ends of the compartment 59 are secured to a pivoted bracket normally resting against a stop under the action of a spring.

The action is as follows:—

The cigarettes are fed down in rows of seven and the compressors $27^c$, $27^a$ move inwards. The compressor $27^c$ is recessed so that it squeezes the top and bottom row only. The end of the compressor stroke is shewn in Fig. 9 and it will be seen that the cigarette in the compartment 59 is isolated leaving six cigarettes in the middle row.

The conveyor pusher piece is shaped to suit the size and shape of the compressed bunch. In the event of a jam, the compartment 59 yields against the spring above mentioned.

Figure 10:
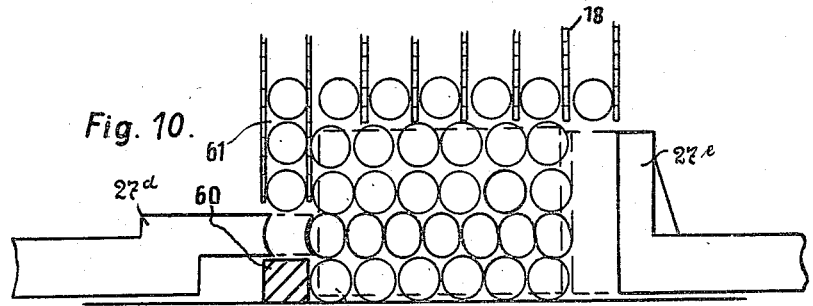
Figure 15:
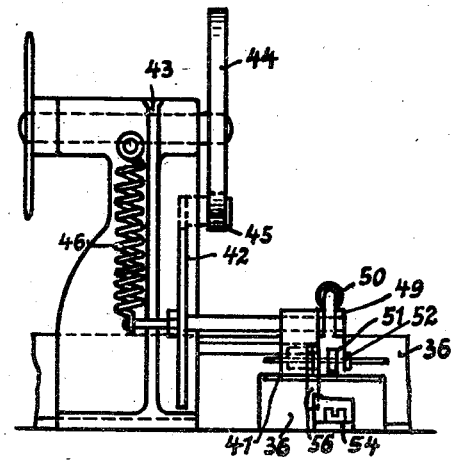
Figure 19:
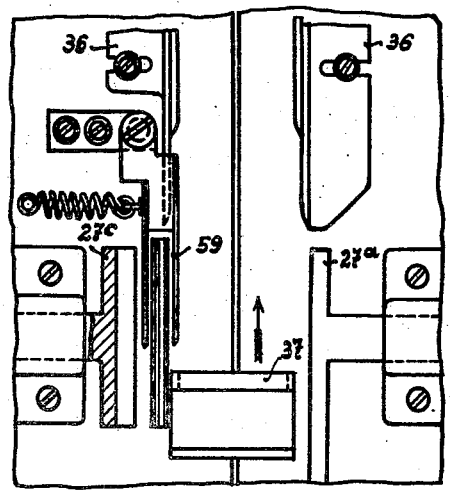
Figure 16:
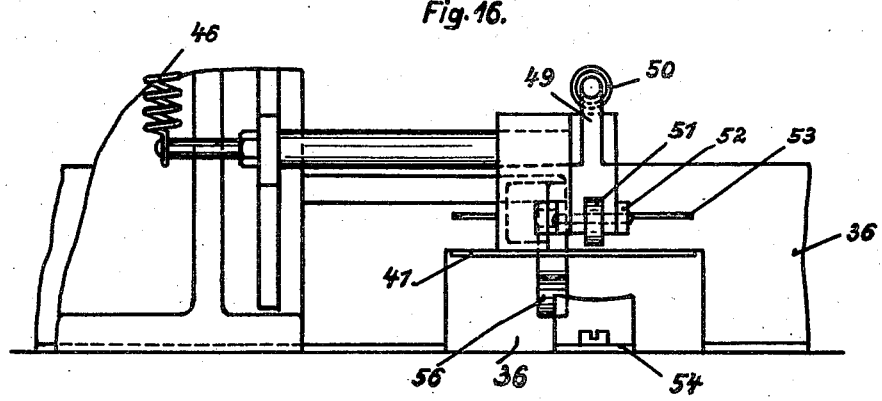
Figure 17:
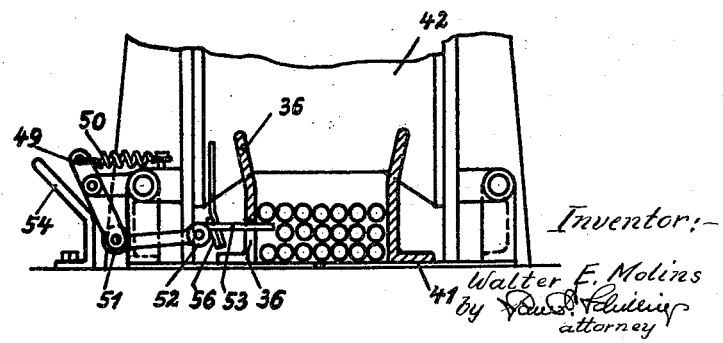

In Fig. 10, a method of grouping twenty-five cigarettes in four rows is shewn, the rows, beginning at the top of the group, containing, six, six, seven, six, cigarettes respectively.

In this arrangement, a block 60 is secured to the machine bed, causing the bottom row to contain six cigarettes. The vane slot 61 feeds cigarettes down upon the block 60, while six other vane slots feed down upon the bottom row of cigarettes. The compressors $27^d$, $27^e$ move in as shewn by the chain lines and squeeze the row above the block 60 so that seven cigarettes occupy a space equal to that occupied by six. The compressor piece $27^d$ is shaped as shewn. The vanes forming the slot 61 are of sufficient length to cut off the upper two rows and so four rows are swept away by the pusher piece 37 in the order required. In this case the cigarettes fall down in a loose condition laterally so that the work done by the compressor is mainly closing them. Thus the cigarettes under the action of the compressors are not squeezed severely.

The front plate of the hopper may be fitted with a glass door to allow the operator to see the cigarettes in motion and rendering access easy to clear jams.

The bars 20 may be connected together and hinged as shewn in Fig. 2 to enable a broken cigarette to be removed from a vane slot.

The lengths of the vanes may be varied and if desired they may be stationary. Or, again the vanes may be so mounted that some are vibrated and others are stationary.

For example, the vanes may be arranged fixed and vibrating alternately, giving a slot opening which increases and decreases as the vanes vibrate.

The various parts of the apparatus may be adjustable and further the apparatus may be combined with cigarette and other packing machines of various types.

Having now particularly described and ascertained the nature of my said invention and in what manner the same is to be performed, I declare that what I claim is:—

1. A hopper feeding apparatus which comprises in combination two plates spaced apart to form the discharge opening of the hopper, means for vibrating said plates, a baffle operatively mounted within the hopper and disposed above said discharge opening, and means for vibrating said baffle.

2. A hopper feeding apparatus which comprises in combination two base plates spaced apart so as to constitute the discharge opening of the hopper, means for vibrating said plates, a baffle comprising two downwardly diverging plates operatively mounted within the hopper so as to extend into close proximity to the said base plates and form a space above the discharge opening, and means for vibrating said baffle.

3. A hopper feeding apparatus which comprises in combination, two base plates spaced apart so as to constitute the discharge opening of the hopper, means for vibrating said plates, two downwardly diverging baffle plates pivotally mounted within the hopper so as to extend into close proximity to the base plates and form a space above the discharge opening, and means operatively disposed between said baffle plates for vibrating the same.

4. A hopper feeding apparatus which comprises in combination a base having a discharge opening formed therein, means for vibrating said base, a baffle mounted within the hopper and disposed above said opening, means for vibrating said baffle, a plurality of guide vanes disposed beneath said opening, so as to constitute the discharge passage therefrom, and means operatively connected to the base of the hopper for vibrating said vanes.

5. A hopper feeding apparatus which comprises in combination a base having a discharge opening formed therein, means for vibrating said base, a baffle mounted within the hopper and disposed above said opening, means for vibrating said baffle, a plurality of guide vanes disposed beneath said opening so as to constitute discharge passages leading therefrom, means operatively connected to the base of the hopper for vibrating said vanes, and means for periodically arresting the movement of articles in said passages.

6. In a packing machine, a hopper, vanes operatively connected to said hopper so as to constitute discharge passages leading therefrom, an endless conveyor movable beneath said passages and provided with pusher pieces thereon, means operatively connected to said conveyor for periodically arresting the movement of articles in said vanes, and pressure mechanism operative to compress articles discharged from said vanes upon said conveyor.

7. In a packing machine, a hopper, vanes operatively connected to said hopper so as to constitute discharge passages leading therefrom, an endless conveyor movable beneath said passages and provided with pusher pieces thereon, a device operatively connected to said pusher pieces for periodically arresting the movement of articles located between said vanes as a pusher piece moves beneath the same, and a pressure mechanism for compressing articles discharged from said vanes upon said conveyor, said pressure mechanism having beveled portions upon which the arresting device is adapted to move.

8. A packing machine which comprises in combination a hopper, means for delivering articles in rows therefrom, a conveyor for receiving the rows of articles from said hopper, guide members for holding the said rows in correct relationship upon said conveyor, and means operable by one of said guide members for varying the number of articles in a row.

9. A packing machine which embodies in combination a hopper mechanism for delivering articles in rows, and means for compressing a predetermined row of articles.

10. A packing machine which comprises in combination a hopper, a plurality of vanes operatively connected thereto, and adapted to constitute discharge passages therefrom, a conveyor located beneath said vanes, and laterally operating pressure mechanism operable beneath said vanes to compress articles deposited upon said conveyor.

11. In a packaging machine, a hopper having a vibratory bottom formed with a discharge opening, means for vibrating the bottom, a baffle arranged within the hopper above the bottom opening, means for agitating the baffle, a plurality of guide vanes arranged beneath the bottom opening and defining passages, means connecting the hopper bottom to the vanes for imparting vibratory motion thereto, an endless conveyor movable beneath the vanes, article engaging members on the conveyor, and a reciprocatory sustaining member movable beneath the passages formed by the vanes following the movement beneath the passage of each engaging member.

12. In a packaging machine, a hopper having a vibratory bottom formed with a discharge opening, means for vibrating the bottom, a baffle arranged within the hopper above the bottom opening, means for agitating the baffle, a plurality of guide vanes arranged beneath the bottom opening and defining passages, means connecting the hopper bottom to the vanes for imparting vibratory movement thereto, and means for collecting the articles delivered from the passages.

13. In a packaging machine, a hopper, vanes defining passages leading therefrom, an endless conveyor movable beneath the passages and having article-engaging means thereon, a sustaining member movable beneath the vanes following the engaging means, and article pressing member for confining the articles on the conveyor.

14. In a packaging machine, a hopper, vanes defining passages leading therefrom, an endless conveyor movable beneath the passages and having article-engaging means thereon, a sustaining member movable beneath the vanes following the engaging means, and article pressing members for confining the articles on the conveyor, said pressing members having beveled portions upon which the engaging means operate.

WALTER EVERETT MOLINS.